United States Patent
Ichikawa et al.

(10) Patent No.: US 10,907,582 B2
(45) Date of Patent: Feb. 2, 2021

(54) PRESSURE SENSOR MALFUNCTION DETERMINATION DEVICE FOR FUEL TANK

(71) Applicant: SUBARU CORPORATION, Tokyo (JP)

(72) Inventors: Tatsuya Ichikawa, Tokyo (JP); Masahiro Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/677,880

(22) Filed: Nov. 8, 2019

(65) Prior Publication Data

US 2020/0158050 A1 May 21, 2020

(30) Foreign Application Priority Data

Nov. 16, 2018 (JP) .................. 2018-215163

(51) Int. Cl.
| | |
|---|---|
| F02D 41/22 | (2006.01) |
| F02M 25/08 | (2006.01) |
| F02D 41/00 | (2006.01) |
| B60K 15/03 | (2006.01) |

(52) U.S. Cl.
CPC ......... *F02M 25/0809* (2013.01); *B60K 15/03* (2013.01); *F02D 41/003* (2013.01); *F02M 25/0836* (2013.01); *F02M 25/0872* (2013.01); *B60K 2015/0321* (2013.01); *F02D 41/222* (2013.01); *F02M 2025/0845* (2013.01)

(58) Field of Classification Search
CPC ............ F02M 25/0809; F02M 25/0836; F02D 41/222; B60K 2015/0321; B60K 2015/03276

USPC ....................................... 123/519; 73/114.39
See application file for complete search history.

(56) References Cited

U.S. PATENT DOCUMENTS

| | | | | |
|---|---|---|---|---|
| 5,775,307 A | * | 7/1998 | Isobe ................. | F02M 25/0809 123/198 D |
| 6,038,912 A | * | 3/2000 | Isobe .................... | G01L 27/007 73/1.59 |

(Continued)

FOREIGN PATENT DOCUMENTS

JP  2015-45264 A  3/2015

*Primary Examiner* — Erick R Solis
(74) *Attorney, Agent, or Firm* — Troutman Pepper Hamilton Sanders LLP

(57) ABSTRACT

A pressure sensor malfunction determination device for a fuel tank includes a fuel tank that stores fuel, a canister that absorbs an evaporated fuel gas and includes a drain port opened to atmosphere, an evaporation path communicating with the canister and fuel tank, a purge gas path communicating with an engine inlet system and the canister, a pressure sensor that detects a pressure, a solenoid valve that opens/closes the evaporation path, and a control unit that controls an opening/closing state of the solenoid valve. When the fuel tank pressure is one of predetermined positive and negative pressure states, the control unit performs valve-opening control on the solenoid valve. The control unit includes a pressure sensor malfunction determination unit that, when an output value of the pressure sensor detected under an atmospheric pressure condition corresponds to a pressure other than the atmospheric pressure, determines that the pressure sensor is malfunctioning.

9 Claims, 4 Drawing Sheets

(56) References Cited

U.S. PATENT DOCUMENTS

| | | | |
|---|---|---|---|
| 2002/0184938 A1* | 12/2002 | Isobe | F02M 25/0809 73/1.71 |
| 2015/0059870 A1 | 3/2015 | Iwaya et al. | |
| 2015/0322902 A1* | 11/2015 | Akita | F02M 25/0809 123/519 |
| 2016/0146158 A1* | 5/2016 | Shimokawa | B60K 15/03504 123/520 |
| 2017/0030303 A1* | 2/2017 | Takakura | B60K 15/03504 |
| 2017/0159616 A1* | 6/2017 | Miyabe | F02D 41/22 |

* cited by examiner

PRESSURE SENSOR MALFUNCTION DETERMINATION DEVICE FOR FUEL TANK

CROSS-REFERENCE TO RELATED APPLICATIONS

The present application claims priority from Japanese Patent Application No. 2018-215163 filed on Nov. 16, 2018, the entire contents of which are hereby incorporated by reference.

BACKGROUND

The disclosure relates to a pressure sensor malfunction determination device for a fuel tank, particularly to a pressure sensor malfunction determination device for a fuel tank which can be sealed to store fuel for an engine.

For a vehicle in which an engine is mounted, volatile fuel such as gasoline or alcohol is mainly used. Such a volatile fuel is vaporized (evaporated) also in a fuel tank not to mention in the atmosphere. In order to reduce leakage of such evaporated fuel gas (hereinafter also referred to as evaporation) into the atmosphere, a canister (charcoal canister) that absorbs the evaporation is mounted in the vehicle. The canister temporarily absorbs the evaporation, the evaporated fuel gas absorbed is supplied as a purge gas to an engine inlet system by utilizing, for example, the negative pressure of the engine, and is further supplied to the combustion chamber of the engine for combustion. A drain port of the canister is opened to the atmosphere in order to introduce the ambient air to the canister in association with supplying of the purge gas to the engine inlet system.

Meanwhile, when evaporation of the fuel in the fuel tank proceeds, for instance, while the vehicle is stopped, the absorption capacity of the canister may be exceeded and excessive fuel may flow to the atmosphere through the drain port of the canister, for instance. Thus, a sealed fuel tank has been developed, which is provided with a tank on-off solenoid valve that opens and closes an evaporation path which communicates with the fuel tank and the canister, and the evaporation path is essentially closed by the tank on-off solenoid valve all the time.

In the sealed fuel tank, when evaporation of the fuel in the fuel tank in a sealed state proceeds, it is expected that the pressure (hereinafter also referred to as the tank internal pressure) in the fuel tank is increased (enhanced). Thus, at the time of fuel feeding, the following control may be performed in the fuel tank: the evaporation in the fuel tank is passed to the canister by opening the tank on-off solenoid valve, the evaporation is absorbed by the canister to reduce the pressure in the fuel tank, and a fuel feed lid is opened, for example. In this control at the time of fuel feeding, it is important that the pressure in the fuel tank be equal or close to the atmospheric pressure, thus fuel feeding is permitted only when the output value of a pressure sensor provided in the fuel tank corresponds to the atmospheric pressure.

SUMMARY

An aspect of the disclosure provides a pressure sensor malfunction determination device for a fuel tank. The device includes a fuel tank, a canister, an evaporation path, a purge gas path, a fuel tank pressure sensor, a tank on-off solenoid valve, and a control unit. The fuel tank is configured to store fuel for an engine. The canister is configured to absorb an evaporated fuel gas in the fuel tank and includes a drain port opened to atmosphere. The evaporation path communicates with the canister and the fuel tank. The purge gas path is configured to communicate with an engine inlet system and the canister. The fuel tank pressure sensor is configured to detect a pressure in the fuel tank. The tank on-off solenoid valve is configured to open and close the evaporation path. The control unit is configured to control an opening and closing state of the tank on-off solenoid valve. When the pressure in the fuel tank detected by the fuel tank pressure sensor is at least one of a predetermined positive pressure state and a predetermined negative pressure state, the control unit performs valve-opening control on the tank on-off solenoid valve. The control unit includes a pressure sensor malfunction determination unit configured to, when an output value of the fuel tank pressure sensor detected under a predetermined atmospheric pressure condition corresponds to a pressure other than an atmospheric pressure, determine that the fuel tank pressure sensor has a malfunction.

An aspect of the disclosure provides a pressure sensor malfunction determination device for a fuel tank. The pressure sensor malfunction determination device for a fuel tank includes a fuel tank, a canister, an evaporation path, a purge gas path, a fuel tank pressure sensor, a tank on-off solenoid valve, a fuel feed switch, and a control unit. The fuel tank is configured to store fuel for an engine. The canister is configured to absorb an evaporated fuel gas in the fuel tank. The canister includes a drain port opened to atmosphere. The evaporation path that communicates with the canister and the fuel tank. The purge gas path is configured to communicate with an engine inlet system and the canister. The fuel tank pressure sensor is configured detect a pressure in the fuel tank. The tank on-off solenoid valve is configured open and close the evaporation path. The fuel feed switch is operable by an occupant when fuel is fed. The control unit is configured to control an opening and closing state of the tank on-off solenoid valve. The control unit performs valve-opening control on the tank on-off solenoid valve when the fuel feed switch is operated by the occupant. The control unit includes a fuel-feeding-time pressure sensor malfunction determination unit configured to determine that the fuel tank pressure sensor has a malfunction when an output value of the fuel tank pressure sensor detected under an atmospheric pressure condition corresponds to a pressure other than an atmospheric pressure. The atmospheric pressure condition is satisfied when a valve opening time of the tank on-off solenoid valve reaches a predetermined time.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
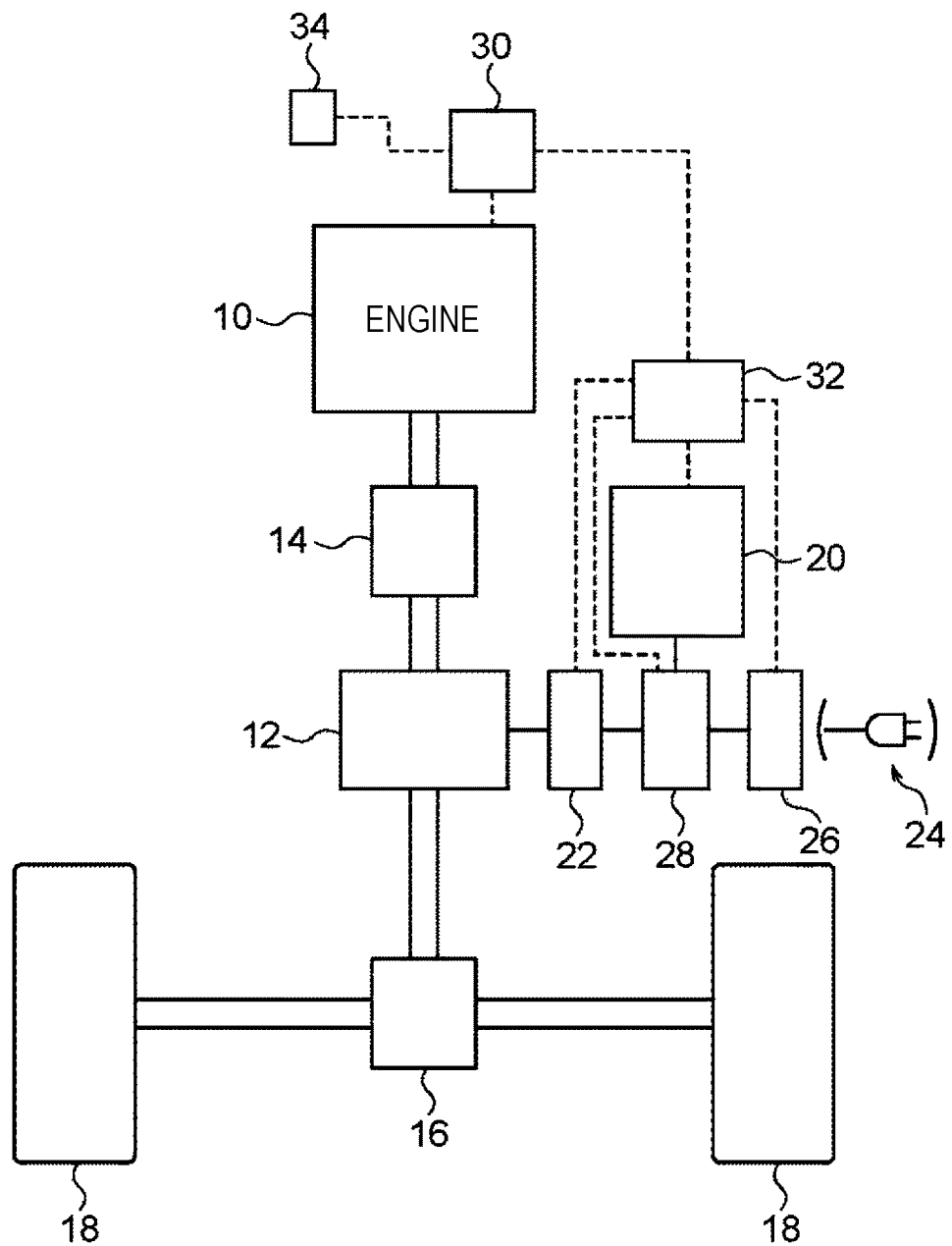
FIG. 1 is a schematic configuration diagram illustrating a vehicle equipped with a pressure sensor malfunction determination device for a fuel tank according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

When the pressure sensor of the fuel tank malfunctions, the output value of the pressure sensor does not correspond to the atmospheric pressure, and fuel feeding may not be permitted indefinitely. Thus, Japanese Unexamined Patent Application Publication (JP-A) No. 2015-45264 describes a pressure sensor malfunction determination device for a fuel tank, which includes a pressure sensor at a position such as in the evaporation path other than in the fuel tank, in addition to a pressure sensor in the fuel tank, and when the output values of the both sensors at the time of fuel feeding differ by at least a predetermined value for a corresponding pressure, determines that one of the two pressure sensors has a malfunction.

However, the pressure sensor malfunction determination device for a fuel tank described in JP-A No. 2015-45264 uses a second pressure sensor in addition to the pressure sensor in the fuel tank, and has a disadvantage in terms of the number of components and the cost because the additional pressure sensor is provided for the purpose of detecting that one of the sensors has a malfunction.

It is desirable to provide a pressure sensor malfunction determination device for a fuel tank, capable of detecting a malfunction of a pressure sensor of the fuel tank without using an additional pressure sensor. FIG. 1 is a schematic configuration diagram illustrating of a vehicle equipped with a pressure sensor malfunction determination device for a fuel tank according to the embodiment. The vehicle is a plug-in hybrid vehicle, and FIG. 1 illustrates a schematic configuration of a power train of the plug-in hybrid vehicle. In the plug-in hybrid vehicle, an engine 10 for driving the vehicle and a motor generator 12 are both mounted. The engine 10 and the motor generator 12 are coupled by a coupling device 14, and a combined driving power or a single driving power is transmitted to drive wheels 18 via a differential device 16. For example, a clutch mechanism is used for the coupling device 14. It is possible to use a planetary pinion mechanism for the coupling device 14. In this case, the engine 10 is coupled to a component of the planetary pinion mechanism, the motor generator 12 is coupled to another component, and a different motor generator (not illustrated) is coupled to the remaining one component. The drive wheels 18 may be four wheels. The symbol 34 illustrated in FIG. 1 indicates a fuel feed switch operated by an occupant when fuel is fed to the later-described fuel tank 36.

The driving system of the motor generator 12 includes a drive battery 20 that supplies electric power to the motor generator 12 as well as stores the electric power collected by the motor generator 12; and a drive circuit 22 such as an inverter for converting the electric power from the drive battery 20 to supply the converted electric power to the motor generator 12 and converting the electric power collected by the motor generator 12 to store the converted electric power in the drive battery 20. The electric vehicle according to the embodiment is a plug-in hybrid vehicle, thus further includes an external connection charger 26 for charging the drive battery 20 with the electric power from a coupled external power supply 24; and a junction box 28 including relays, for electrically coupling or decoupling the external connection charger 26 to or from the drive battery 20 and electrically coupling or decoupling the drive battery 20 to or from the motor generator 12.

In the embodiment, a three-phase AC motor is used for the motor generator 12. In contrast, the electric power of the drive battery 20 is DC power, thus the drive circuit 22 converts the DC power to three-phase AC power and supplies the three-phase AC power to the motor generator 12. When the motor generator 12 is regeneratively driven, a reverse operation is performed. The external connection charger 26 according to the embodiment converts the AC power of the external power supply 24 such as a commercial power supply to DC power, and charges the drive battery 20 with the DC power. Thus, the external connection charger 26 includes, for example, an AC-DC converter and a DC-DC converter. It is to be noted that a circuit for coupling a quick charge power supply to the drive battery 20 may be added. The quick charge power supply may be a high voltage DC power supply.

In the plug-in hybrid vehicle according to the embodiment, the operational state of the engine 10 is controlled by an engine control unit 30, and the operational state of the motor generator 12, for example, power operation and regenerative operation are controlled by a power control unit 32. A control unit that integrates these units and controls the overall driving power of the vehicle may be included. In addition, a battery control unit for controlling the drive battery 20 may be included. It is to be noted that these control units each include a computer system and have high calculation processing capability as described later. In general, in a hybrid vehicle including the plug-in hybrid vehicle, the engine 10 is controlled in collaboration with the motor generator 12. Alternatively, the power control unit 32 and the drive circuit 22 may be permanently affixed.

The control unit such as the power control unit 32 or the engine control unit 30 includes a mounted computer system such as a microcomputer. Similarly to a well-known computer system, in addition to a calculation processing device having a high level calculation processing function, the computer system includes, for example, a storage device that stores programs, and an I/O device for reading a sensor signal and performing mutual communication with another control unit.

Figure 2:
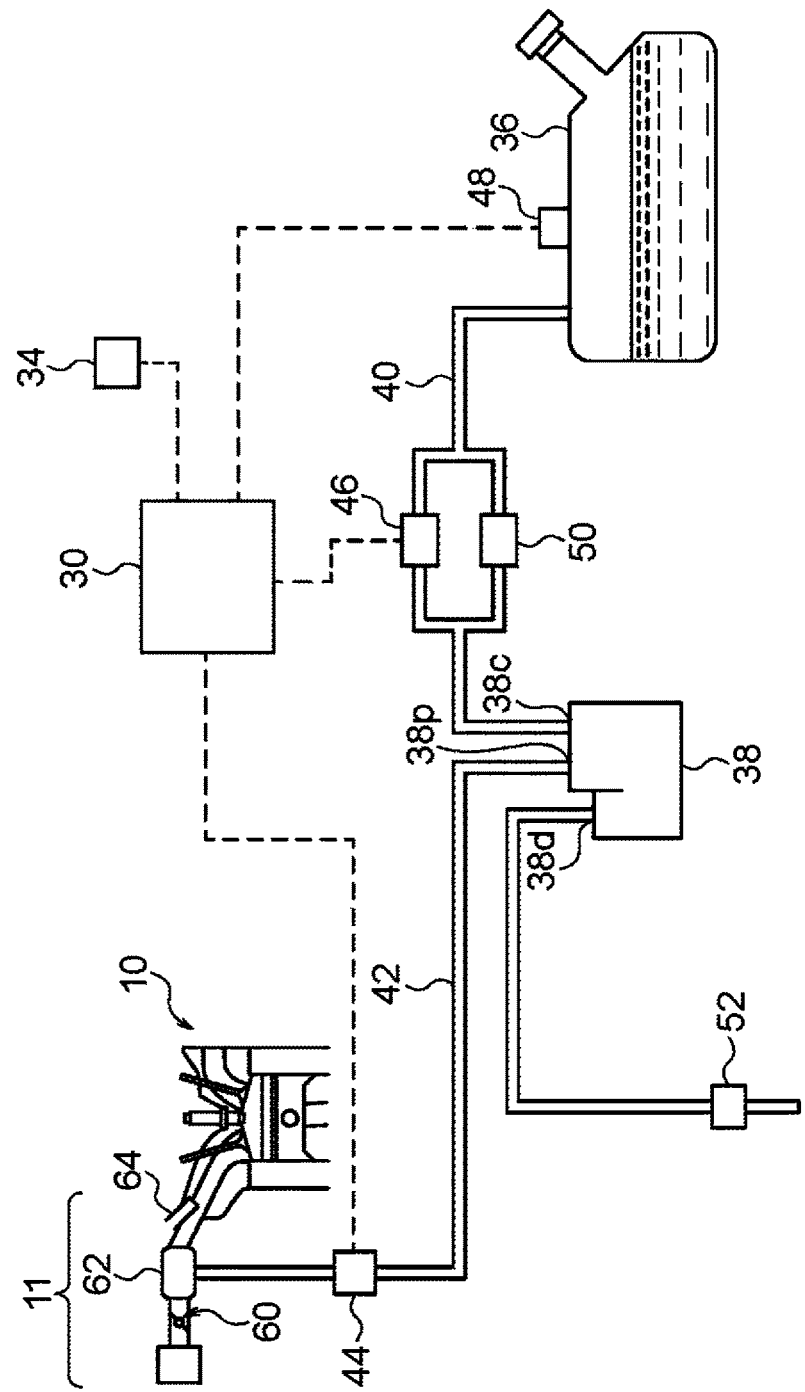
FIG. 2 is a schematic configuration diagram illustrating of an evaporated fuel gas path between the fuel tank and the engine of the vehicle in FIG. 1.

FIG. 2 is a schematic configuration diagram illustrating of an evaporated fuel gas path between a fuel tank 36 and the engine 10 of the plug-in hybrid vehicle of FIG. 1. Volatile fuel such as gasoline is used as the fuel for the engine 10, and the fuel is fed to and stored in the fuel tank 36. The most of the fuel supplied to the engine 10 is sucked from the fuel tank 36 by a fuel pump (not illustrated) for example, and is further ejected from a fuel ejection device 64 to an engine inlet system 11 or a combustion chamber. As described above, the fuel comprised of volatile fuel, for the engine 10 is also vaporized (evaporated) in the fuel tank 36, the evaporated fuel gas (evaporation) is temporarily absorbed by a canister 38, and the evaporated fuel gas absorbed by the canister 38 is further supplied as a purge gas to the engine inlet system 11 and used for combustion in the engine 10. The path communicating with the fuel tank 36 and the canister 38 is defined as an evaporation path 40. The path communicating with the canister 38 and the engine inlet system 11 is defined as a purge gas path 42. It is to be noted that in the canister 38, a charge port 38*c* is coupled to the evaporation path 40, a purge port 38*p* is coupled to the purge gas path 42, and a drain port 38*d* is opened to the atmosphere via a filter 52. Incidentally, the drain port 38*d* may be provided with a device for detecting leakage in the evaporated fuel gas path.

The purge gas path 42 is provided with a purge control solenoid valve 44 that opens and closes the purge gas path 42. As described later, valve-opening control is performed on the purge control solenoid valve 44 by duty control, and a purge gas is supplied to the engine inlet system 11 with a predetermined concentration (percentage). The evaporation path 40 bifurcates at a central portion of FIG. 2, and a relief valve 50 is inserted in one evaporation bifurcation path and a tank on-off solenoid valve 46 is inserted in the other evaporation bifurcation path. The relief valve 50 between these valves is provided, for example, in case of excessively increased pressure state in the fuel tank 36 to relieve the internal pressure of the fuel tank 36 and supply the evaporation to the canister 38. As described later, the tank on-off solenoid valve 46 is for supplying the evaporation in the fuel tank 36 to the canister by being valve-opening controlled for a predetermined time for every predetermined interval, for example, and for sucking the ambient air into the fuel tank 36 through the drain port 38*d* of the canister 38 by being opened continuously for a predetermined time. The purge control solenoid valve 44 and the tank on-off solenoid valve 46 are valve-opening controlled by the engine control unit 30.

Thus, in the plug-in hybrid vehicle according to the embodiment, the sealed state of the fuel tank 36 can be achieved by closing the tank on-off solenoid valve 46 (the relief valve 50 is essentially closed all the time). If the evaporation path 40 maintains a state which allows communication between the fuel tank 36 and the canister 38, the evaporation in the fuel tank 36 may flow to the atmosphere through the drain port 38*d* of the canister 38, for example. Thus, normally, the evaporation in the fuel tank 36 is prevented from flowing to the canister 38 by closing the tank on-off solenoid valve 46 to cut-off the evaporation path 40. It is to be noted that the fuel tank 36 is provided with a fuel tank pressure sensor 48 for detecting the pressure state in the fuel tank 36. In the fuel tank pressure sensor 48 according to the embodiment, a relative pressure (gauge pressure) sensor is used that outputs zero for the atmospheric pressure, a positive value for a high pressure (positive pressure) state higher than the atmospheric pressure, and a negative value for a low pressure (negative pressure) state lower than the atmospheric pressure, for v.

Hereinafter the summary of the evaporation and the purge control of the purge gas in the plug-in hybrid vehicle according to the embodiment will be described. It is to be noted that "purge" is an English word meaning cleanout, elimination, purification, or ostracism. The evaporation absorbed by the canister 38 is sucked into the downstream side of a throttle valve 60, specifically, within an intake manifold 62 as a purge gas by the negative pressure of the engine inlet system 11, and is further combusted in the combustion chamber of the engine 10. Canister purge control is to control the supply amount of the purge gas, and the control is performed by duty-controlling the open valve state of the purge control solenoid valve 44. The canister control is performed during an operation of the engine.

In the plug-in hybrid vehicle, when the pressure value in the fuel tank 36 detected by the fuel tank pressure sensor (hereinafter simply referred to as the pressure sensor) 48 exceeds a predetermined positive pressure value, which is set to a value higher than the atmospheric pressure, control is performed in collaboration with the canister purge control such that the tank on-off solenoid valve 46 is opened, and the evaporation in the fuel tank 36 along with a purge gas is supplied to the engine and is combusted. Purge of the evaporation in the fuel tank 36 is defined as the direct purge, and control thereof is defined as the direct purge control. In the direct purge control, the tank on-off solenoid valve 46 is opened for every predetermined interval, for example, for a short valve opening time such as 50 msec. or 100 msec., and the evaporation in the fuel tank 36 is supplied from the evaporation path 40 to the engine inlet system 11 through the purge gas path 42. The reason why the tank on-off solenoid valve 46 is opened for a short time in this manner is to limit the flow amount of the evaporation in the fuel tank 36 into the purge gas path 42 so that the evaporated fuel gas component in the purge gas path 42 is not increased excessively.

In the direct purge control, the total purge flow volume of the evaporation in the fuel tank 36 since the start of the direct purge is calculated as appropriate, and stored. The pressure (negative pressure) state in the intake manifold is detected, for example, by a pressure sensor provided in the intake manifold. In contrast, the pressure state of the evaporation path 40 is the output value of the pressure sensor 48, and has a correlation with the amount of evaporation generated which depends on the temperature. Therefore, the rate of flow of the evaporation in the fuel tank 36 passing through the tank on-off solenoid valve can be determined, for example, from the differential pressure between the pressure state of the evaporation path 40 and the pressure state in the intake manifold, and the valve opening characteristics (valve opening time) of the tank on-off solenoid valve 46.

As described above, the fuel tank 36 and the canister 38 are decoupled by a tank communication solenoid valve in a normal time, and valve-opening control is performed on the tank communication solenoid valve only when fuel is fed and when the pressure of the fuel tank is increased. Thus, the canister 38 only absorbs the evaporation when the tank communication solenoid valve is in an opened state. The amount of ejection of fuel into the engine inlet system 11 or the combustion chamber is decreased by control with a predetermined percentage during the canister purge control and the direct purge control. The fuel feed switch 34 mentioned above is called a fuel feeding request switch, and is operated to be turned on when an occupant is going to feed fuel from now on. When the fuel feed switch 34 is operated to be turned on, the evaporation in the fuel tank 36 is supplied to the canister 38 by opening the tank on-off solenoid valve 46 as in the later-described calculation processing, or the ambient air is flown into the fuel tank 36 through the drain port 38*d* of the canister 38, thereby achieving the atmospheric pressure state in the fuel tank 36, and in the state, the fuel feed lid is opened, for example.

Figure 3:
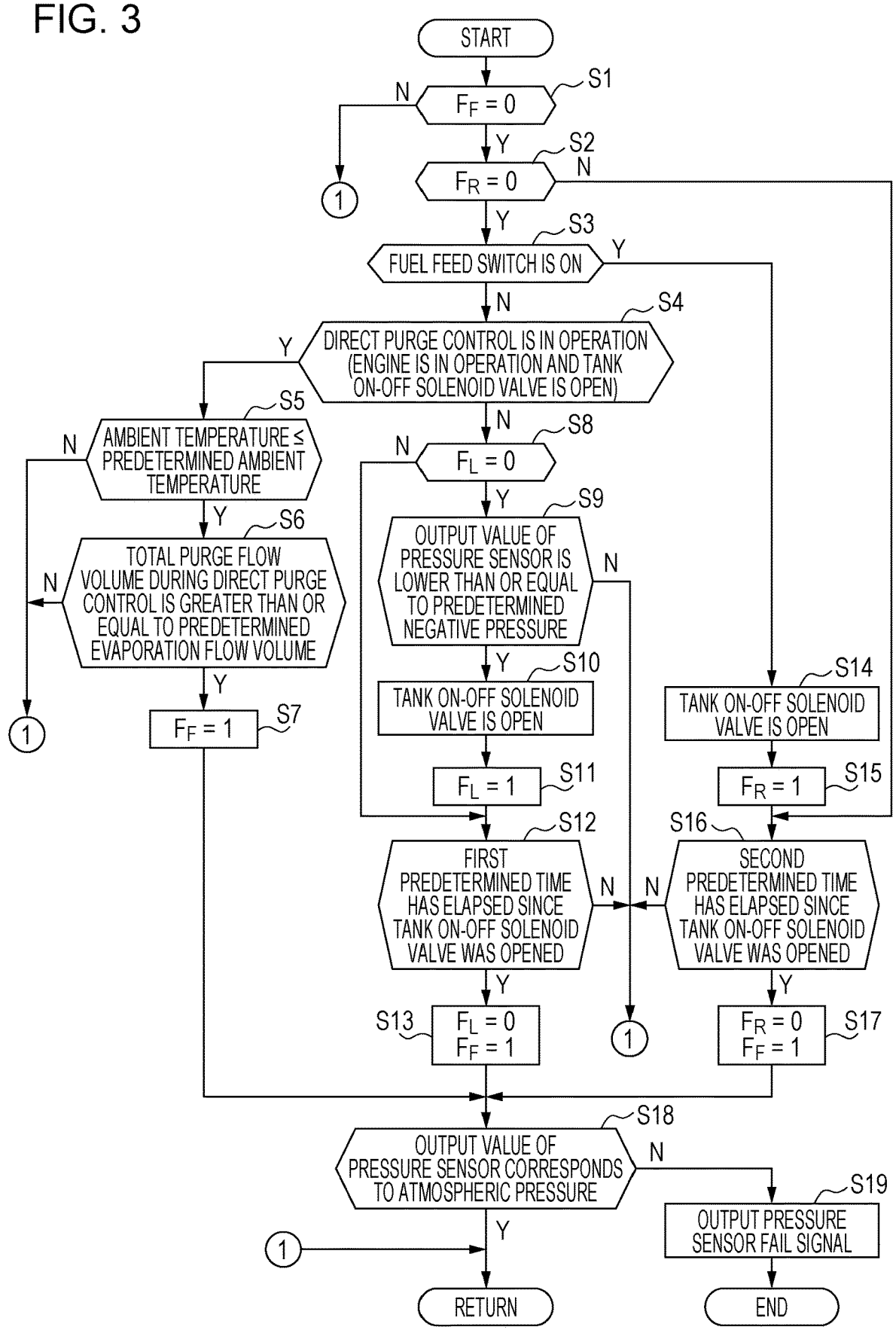
FIG. 3 is a flowchart illustrating an example of calculation processing performed by an engine control unit of FIG. 1.

FIG. 3 is a flowchart illustrating an example of calculation processing performed by the engine control unit 30 to determine whether the pressure sensor 48 of the fuel tank 36 has a malfunction. The calculation processing is timer interrupt processing which is performed with a predetermined sampling period, for example. First, in step S1, it is determined whether a pressure sensor check flag $F_F$ is zero and in a reset state. When the pressure sensor check flag $F_F$ is in a reset state, the flow proceeds to step S2, otherwise the flow is returned. It is to be noted that the pressure sensor check flag $F_F$ is reset, for example, when the vehicle system is started (corresponding to ignition switch on).

In step S2, it is determined whether a fuel feed flag $F_R$ is zero and in a reset state. When the fuel feed flag $F_R$ is in a reset state, the flow proceeds to step S3, otherwise the flow proceeds to step S16.

In step S3, it is determined whether the fuel feed switch 34 is operated to be turned on. When the fuel feed switch 34 is operated to be turned on, the flow proceeds to step S14, otherwise the flow proceeds to step S4.

In step S4, it is determined whether the above-described direct purge control is in operation according to individual calculation processing, in other words, whether the engine is in operation and the valve-opening control of the tank on-off solenoid valve 46 is in operation. When the direct purge control is in operation, the flow proceeds to step S5, otherwise the flow proceeds to step S8.

In step S5, it is determined whether the ambient temperature detected by an ambient temperature sensor (not illustrated) is lower than or equal to a predetermined ambient temperature value. When the ambient temperature is lower than or equal to a predetermined ambient temperature value, the flow proceeds to step S6, otherwise the flow is returned. The predetermined ambient temperature value is set to a temperature value at which the amount of evaporation generated in the fuel tank 36 is significantly increased as the ambient temperature rises for example, and reduction control of the amount of evaporation generated in the fuel tank 36 is not achievable by a normal direct purge control.

In step S6, it is determined whether the total purge flow volume during the above-described direct purge control is greater than or equal to a predetermined value of evaporation flow volume. When the total purge flow volume is greater than or equal to a predetermined value of evaporation flow volume, the flow proceeds to step S7, otherwise the flow is returned. The predetermined value of evaporation flow volume is an evaporation flow volume value with which the pressure in the fuel tank 36 reaches substantially the atmospheric pressure by the total purge flow volume during the direct purge control, in other words, the evaporation flow volume flown from the fuel tank 36, and the evaporation flow volume value corresponds to approximately the amount of evaporation generated in the fuel tank 36. Since the amount of evaporation generated in the fuel tank 36 corresponds to the pressure state in the fuel tank 36, in other words, the output value of the pressure sensor 48, a predetermined value of evaporation flow volume can be set from the output value of the pressure sensor 48 at the start of the direct purge control. When the direct purge control starts with, for example, a predetermined positive pressure state in the fuel tank 36, in other words, a predetermined output value of the pressure sensor 48, the predetermined value of evaporation flow volume may be a fixed value according to the predetermined output value of the pressure sensor 48.

The determination that the total purge flow volume during the direct purge control is greater than or equal to a predetermined value of evaporation flow volume may be made, for example, when the tank on-off solenoid valve 46 is opened at least a predetermined number of valve opening according to the pressure in the fuel tank detected by the pressure sensor 48. As described above, the tank on-off solenoid valve 46 during the direct purge is opened for a predetermined short time for every predetermined interval. Since the evaporation flow volume in a single direct purge is substantially determined according to the pressure state in the fuel tank 36, a predetermined value of evaporation flow volume for the pressure in the fuel tank 36 to return to the atmospheric pressure can be substantially determined by the number of valve opening according to the pressure in the fuel tank 36. Therefore, the determination that the total purge flow volume of the evaporation in this step is greater than or equal to a predetermined value of evaporation flow volume may be made when the tank on-off solenoid valve 46 is opened at least a predetermined number of valve opening according to the pressure state in the fuel tank 36. It is to be noted that when the direct purge control starts with a predetermined positive pressure state in the fuel tank 36, the pressure state in the fuel tank 36, in other words, the amount of evaporation generated in the fuel tank 36 is substantially determined, thus the predetermined number of valve opening of the tank on-off solenoid valve 46 may be a fixed value.

In step S7, the pressure sensor check flag $F_F$ is set to one indicating a set state, then the flow proceeds to step S18.

Meanwhile, in step S8, it is determined whether a negative pressure flag $F_L$ is zero and in a reset state. When the negative pressure flag $F_L$ is in a reset state, the flow proceeds to step S9, otherwise the flow proceeds to step S12.

In step S9, it is determined whether the output value of the pressure sensor 48 is lower than or equal to a predetermined negative pressure value. When the output value of the pressure sensor 48 is lower than or equal to a predetermined negative pressure value, the flow proceeds to step S10, otherwise the flow is returned.

In step S10, opening control is performed on the tank on-off solenoid valve 46, and the flow proceeds to step S11.

In step S11, the negative pressure flag $F_L$ is set to one indicating a set state, and the flow proceeds to step S12.

In step S12, it is determined whether a first predetermined time has elapsed since the opening control of the tank on-off solenoid valve 46. When a first predetermined time has elapsed since the opening control of the tank on-off solenoid valve 46, the flow proceeds to step S13, otherwise the flow is returned. The first predetermined time is a time taken for the pressure in the fuel tank 36 to return to the atmospheric pressure state in a valve opened state of the tank on-off solenoid valve 46 by the ambient air through the drain port 38d of the canister 38. The first predetermined time is set to three seconds, for example.

In step S13, the negative pressure flag $F_L$ is set to zero indicating a reset state and the pressure sensor check flag $F_F$ is set to one indicating a set state, then the flow proceeds to step S18.

In step S14, opening control is performed on the tank on-off solenoid valve 46, and the flow proceeds to step S15.

In step S15, the fuel feed flag $F_R$ is set to one indicating a set state, and the flow proceeds to step S16.

In step S16, it is determined whether a second predetermined time has elapsed since the opening control of the tank on-off solenoid valve 46. When a second predetermined time has elapsed since the opening control of the tank on-off solenoid valve 46, the flow proceeds to step S17, otherwise the flow is returned. The second predetermined time is a time taken for the pressure in the fuel tank 36 to return to the atmospheric pressure state in a valve opened state of the tank on-off solenoid valve 46 by the ambient air through the drain port 38*d* of the canister 38, or by flow of the evaporation in the fuel tank 36 to the canister 38. The second predetermined time is set to three seconds, for example.

In step S17, the fuel feed flag $F_R$ is set to zero indicating a reset state and the pressure sensor check flag $F_F$ is set to one indicating a set state, then the flow proceeds to step S18.

In step S18 described above, it is determined whether the output value of the pressure sensor 48 corresponds to the atmospheric pressure. When the output value of the pressure sensor 48 corresponds to the atmospheric pressure, the flow is returned, otherwise, that is, the output value corresponds to a pressure other than the atmospheric pressure, the flow proceeds to step S19.

In step S19, a malfunction (fail in FIG. 3) signal of the pressure sensor 48 is outputted, then the processing is completed. It is to be noted that the malfunction signal of the pressure sensor 48 may include, for example, a lighting command for an engine trouble lamp of an instrument panel.

In the calculation processing, after a predetermined positive pressure state is achieved in the fuel tank 36, the direct purge control is started, and when the total purge flow volume of the evaporation flowing from the fuel tank 36 to the canister 38 exceeds a predetermined value of evaporation flow volume by the direct purge control, that is, the valve-opening control of the tank on-off solenoid valve 46 in association with the valve-opening control of the purge control solenoid valve 44, and the atmospheric pressure state is considered to be achieved, it is determined whether the pressure sensor 48 has a malfunction. In addition, after a predetermined negative pressure state is achieved in the fuel tank 36, opening control is performed on the tank on-off solenoid valve 46, and when the first predetermined time has elapsed since the opening control and the atmospheric pressure state is considered to be achieved in the fuel tank 36, it is determined whether the pressure sensor 48 has a malfunction. When the fuel feed switch is operated to be turned on, opening control is performed on the tank on-off solenoid valve 46, and when the second predetermined time has elapsed since the opening control and the atmospheric pressure state is considered to be achieved in the fuel tank 36, it is determined whether the pressure sensor 48 has a malfunction. When the output value of the pressure sensor 48 does not corresponds to the atmospheric pressure in these atmospheric pressure states in the fuel tank, in other words, under the atmospheric pressure condition, the pressure sensor 48 is considered to have a malfunction.

Figure 4:
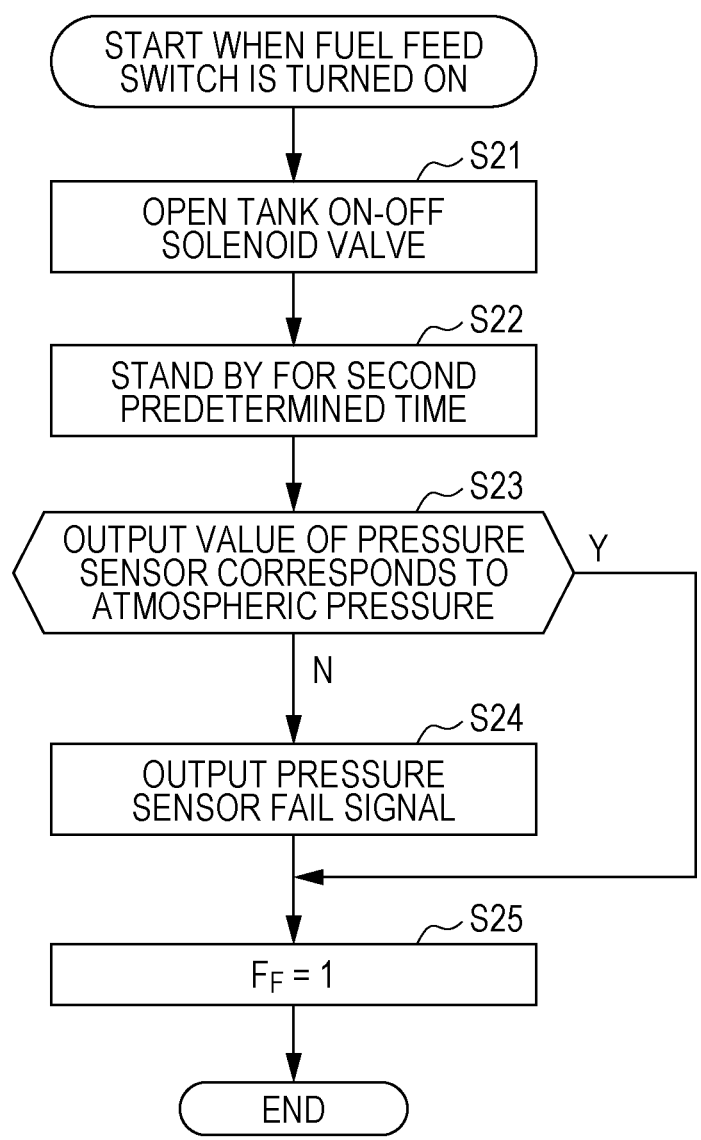
FIG. 4 is a flowchart illustrating another example of calculation processing performed by the engine control unit of FIG. 1.

FIG. 4 is a flowchart illustrating another example of calculation processing performed by the engine control unit 30 to determine whether the pressure sensor 48 has a malfunction. The calculation processing is started upon an operation of turning on the fuel feed switch, and first, in step S21, opening control is performed on the tank on-off solenoid valve 46.

Next, the flow proceeds to step S22, and the engine control unit 30 stays on standby until the second predetermined time elapses since the opening control of the tank on-off solenoid valve 46.

Next, the flow proceeds to step S23, and it is determined whether the output value of the pressure sensor 48 corresponds to the atmospheric pressure. When the output value of the pressure sensor 48 corresponds to the atmospheric pressure, the flow proceeds to step S25, otherwise the flow proceeds to step S24.

In step S24, a malfunction (fail in FIG. 3) signal of pressure sensor 48 is outputted, then the flow proceeds to step S25. It is to be noted that the malfunction signal of the pressure sensor 48 may include, for example, a lighting command for an engine trouble lamp of an instrument panel.

In step S25 described above, the pressure sensor check flag $F_F$ is set to one indicating a set state, and the processing is completed.

In the calculation processing, after the fuel feed switch is operated to be turned on, opening control is performed on the tank on-off solenoid valve 46, and when the second predetermined time has elapsed since the opening control and the atmospheric pressure state is considered to be achieved in the fuel tank 36, it is determined whether the pressure sensor 48 has a malfunction. When the output value of the pressure sensor 48 does not corresponds to the atmospheric pressure in the atmospheric pressure state in the fuel tank, in other words, under the atmospheric pressure condition, the pressure sensor 48 is considered to have a malfunction. It is to be noted that the calculation processing is performed by operating the engine control unit 30 even when the vehicle system is stopped (corresponding to ignition switch off), for example.

In this manner, in the pressure sensor malfunction determination device for a fuel tank according to the embodiment, when the pressure in the fuel tank 36 detected by the pressure sensor 48 is in a predetermined positive pressure state, the evaporation in the fuel tank 36 is supplied to the engine inlet system 11 through the evaporation path 40 and the purge gas path 42, and the pressure in the fuel tank 36 is reduced, for example, by performing valve-opening control on the tank on-off solenoid valve 46 while performing valve-opening control on the purge control solenoid valve 44 during an operation of the engine. When the pressure in the fuel tank 36 detected by the pressure sensor 48 is in a predetermined negative pressure state, the ambient air flows into the fuel tank 36 through the drain port 38*d*, which is opened to the atmosphere, of the canister 38 by performing valve-opening control on the tank on-off solenoid valve 46, and the pressure in the fuel tank 36 is increased. Therefore, under the condition that the pressure in the fuel tank 36 is in a positive pressure state, the atmospheric pressure state is achieved in the fuel tank 36 at the point when the evaporation in the fuel tank 36 is sufficiently supplied to the engine inlet system 11, or under the condition that the pressure in the fuel tank 36 is in a negative pressure state, the atmospheric pressure state is achieved in the fuel tank 36 at the point when the ambient air is sufficiently flown into the fuel tank 36. In other words, a predetermined atmospheric pressure condition is satisfied, thus when the output value of the pressure sensor 48 detected under the atmospheric pressure condition corresponds to a pressure other than the atmospheric pressure, it can be accurately determined that the pressure sensor 48 has a malfunction. Consequently, a malfunction of the pressure sensor 48 of the fuel tank 36 can be detected without using an additional pressure sensor. A malfunction of the pressure sensor 48 of the fuel tank 36 can be detected not only when the vehicle is stopped, but also when the vehicle is running.

The output value of the pressure sensor 48 indicates the pressure state in the fuel tank 36, which depends on the amount of evaporation generated in the fuel tank 36, thus a predetermined value of evaporation flow volume is set according to the amount of evaporation generated, in other words, the output value of the pressure sensor 48, and when the evaporation flow volume supplied from the fuel tank 36 to the engine inlet system 11 exceeds the predetermined value of evaporation flow volume, it may be considered that the pressure state in the fuel tank 36 corresponds to the atmospheric pressure. Thus, it is defined that the atmospheric pressure condition is satisfied when the evaporation flow volume supplied from the fuel tank 36 to the engine inlet system 11 exceeds the predetermined value of evaporation flow volume, and when the output value of the pressure sensor 48 detected under the atmospheric pressure condition corresponds to a pressure other than the atmospheric pressure, it can be accurately determined that the pressure sensor 48 has a malfunction.

When the tank on-off solenoid valve 46 is opened for a predetermined time for every predetermined interval, the flow volume of evaporation which flows through the tank on-off solenoid valve 46 for one opening depends on the differential pressure between the pressure states in the fuel tank 36 and the engine inlet system 11, and the valve opening characteristics of the tank on-off solenoid valve 46. Therefore, a predetermined number of valve opening corresponding to the predetermined value of evaporation flow volume can be substantially set from the characteristics of evaporation flow volume per opening of the tank on-off solenoid valve 46, and the pressure state (the amount of evaporation generated) in the fuel tank 36, and when the tank on-off solenoid valve 46 is opened the predetermined number of valve opening or greater, it may be considered that the pressure state in the fuel tank 36 corresponds to the atmospheric pressure. Thus, it is defined that the atmospheric pressure condition is satisfied when the tank on-off solenoid valve 46 is opened at least the predetermined number of valve opening corresponding to the output value of the pressure sensor 48, and when the output value of the pressure sensor 48 detected under the atmospheric pressure condition corresponds to a pressure other than the atmospheric pressure, it can be accurately determined that the pressure sensor 48 has a malfunction.

When the pressure in the fuel tank 36 is in a negative pressure state, the flow rate of the ambient air into the fuel tank 36 upon opening the tank on-off solenoid valve 46 depends on the valve opening characteristics of the tank on-off solenoid valve 46. Thus, a time taken for the pressure in the fuel tank 36 to return to the atmospheric pressure is set to a predetermined time using the flow rate of the ambient air into the fuel tank according to the valve opening characteristics of the tank on-off solenoid valve 46, and thus when the valve opening time of the tank on-off solenoid valve 46 reaches the predetermined time, it may be considered that the pressure state in the fuel tank 36 corresponds to the atmospheric pressure. Therefore, when the output value of the pressure sensor 48 detected under the atmospheric pressure condition corresponds to a pressure other than the atmospheric pressure, it can be accurately determined that the pressure sensor 48 has a malfunction.

When an occupant operates a fuel feed switch for fuel feeding, valve-opening control is performed on the tank on-off solenoid valve 46 to achieve the atmospheric pressure state in the fuel tank 36. In this case, the flow rate of the ambient air into the fuel tank 36 or the flow rate of the evaporation in the fuel tank into the canister 38 upon opening the tank on-off solenoid valve 46 depends on the valve opening characteristics of the tank on-off solenoid valve 46. Thus, a time taken for the pressure in the fuel tank 36 to return to the atmospheric pressure is set to a predetermined time using the flow rate of the ambient air into the fuel tank or the flow rate of the evaporation in the fuel tank into the canister according to the valve opening characteristics of the tank on-off solenoid valve 46, and thus when the valve opening time of the tank on-off solenoid valve 46 reaches the predetermined time, it may be considered that the pressure state in the fuel tank 36 corresponds to the atmospheric pressure. Therefore, when the output value of the pressure sensor 48 detected under the atmospheric pressure condition corresponds to a pressure other than the atmospheric pressure, it can be accurately determined that the pressure sensor 48 has a malfunction.

Although the pressure sensor malfunction determination device for a fuel tank according to the embodiment has been described above, the disclosure is not limited to the configuration described in the embodiment and may be modified in various manners in the range of the gist of the disclosure. For example, although the calculation processing of FIG. 3 and the calculation processing of FIG. 4 are both performed by the engine control unit 30 in the embodiment, the calculation processing of FIG. 4 may not be performed. Instead of performing the calculation processing of FIG. 4, step S14 to step S17 of the calculation processing of FIG. 3 may be skipped.

The detail of the direct purge control is not limited to what has been described above, and duty control may be performed on the tank on-off solenoid valve 46, for example.

In the embodiment, only an example has been described in detail, in which the pressure sensor malfunction determination device for a fuel tank according to the disclosure is applied to a plug-in hybrid vehicle. However, the pressure sensor malfunction determination device for a fuel tank according to the disclosure may be applied not only to a general hybrid vehicle, but also to a conventional vehicle equipped with only the engine as a driving source.

According to the disclosure, when the pressure in the fuel tank in a sealed state (hereinafter the fuel tank is assumed to be in a sealed state), detected by the fuel tank pressure sensor is in a predetermined positive pressure state, the evaporated fuel gas (evaporation) in the fuel tank is supplied to the engine inlet system through the evaporation path and the purge gas path, and the pressure in the fuel tank is reduced, for example, by performing valve-opening control on the tank on-off solenoid valve while performing valve-opening control on the purge control solenoid valve during an operation of the engine. On the other hand, when the pressure in the fuel tank detected by the fuel tank pressure sensor is in a predetermined negative pressure state, the ambient air flows into the fuel tank through the drain port, which is opened to the atmosphere, of the canister by performing valve-opening control on the tank on-off solenoid valve, and the pressure in the fuel tank is increased.

Therefore, under the condition that the pressure in the fuel tank is in a positive pressure state, the atmospheric pressure state is achieved in the fuel tank at the point when the evaporation in the fuel tank is sufficiently supplied to the engine inlet system, or under the condition that the pressure in the fuel tank is in a negative pressure state, the atmospheric pressure state is achieved in the fuel tank at the point when the ambient air is sufficiently flown into the fuel tank. In other words, a predetermined atmospheric pressure condition is satisfied, thus when the output value of the fuel tank pressure sensor detected under the atmospheric pressure condition corresponds to a pressure other than the atmospheric pressure, it can be accurately determined that the fuel tank pressure sensor has a malfunction. Consequently, a malfunction of the pressure sensor of the fuel tank can be detected without using an additional pressure sensor. A malfunction of the pressure sensor of the fuel tank can be detected not only when the vehicle is stopped, but also when the vehicle is running.

The output value of the fuel tank pressure sensor indicates the pressure state in the fuel tank, which depends on the amount of evaporation generated in the fuel tank, thus the evaporation flow rate for supplying the amount of evaporation generated to the engine inlet system and returning the pressure state in the fuel tank to the atmospheric pressure state can be set according to the output value of the fuel tank pressure sensor. Thus, a predetermined value of evaporation flow volume is set according to the amount of evaporation generated, in other words, the output value of the fuel tank pressure sensor, and when the evaporation flow volume supplied from the fuel tank to the engine inlet system exceeds the predetermined value of evaporation flow volume, it may be considered that the pressure state in the fuel tank corresponds to the atmospheric pressure. Thus, it is defined that the atmospheric pressure condition is satisfied when the evaporation flow volume supplied from the fuel tank to the engine inlet system exceeds the predetermined value of evaporation flow volume, and when the output value of the fuel tank pressure sensor detected under the atmospheric pressure condition corresponds to a pressure other than the atmospheric pressure, it can be accurately determined that the fuel tank pressure sensor has a malfunction.

When the tank on-off solenoid valve is opened for a predetermined time for every predetermined interval, the flow volume of evaporation which flows through the tank on-off solenoid valve for one opening substantially depends on the differential pressure between the amount of evaporation generated in the fuel tank, that is, the pressure state in the fuel tank and the pressure state in the engine inlet system, and the valve opening characteristics of the tank on-off solenoid valve. Therefore, a predetermined number of valve opening corresponding to the predetermined value of evaporation flow volume can be substantially set from the characteristics of evaporation flow volume per opening of the tank on-off solenoid valve, and the pressure state (the amount of evaporation generated) in the fuel tank. When the tank on-off solenoid valve is opened the predetermined number of valve opening or greater, it may be considered that the pressure state in the fuel tank corresponds to the atmospheric pressure. Thus, it is defined that the atmospheric pressure condition is satisfied when the tank on-off solenoid valve is opened at least the predetermined number of valve opening corresponding to the output value of the fuel tank pressure sensor, in other words, when the flow volume of evaporation from the fuel tank to the engine inlet system exceeds the predetermined value of evaporation flow volume. When the output value of the pressure sensor of the fuel tank detected under the atmospheric pressure condition corresponds to a pressure other than the atmospheric pressure, it can be accurately determined that the fuel tank pressure sensor has a malfunction.

When the pressure in the fuel tank is in a predetermined negative pressure state, the flow rate of the ambient air into the fuel tank upon opening the tank on-off solenoid valve depends on the valve opening characteristics of the tank on-off solenoid valve. Therefore, a time taken for the pressure in the fuel tank to return to the atmospheric pressure is set to a predetermined time using the flow rate of the ambient air into the fuel tank according to the valve opening characteristics of the tank on-off solenoid valve, and thus when the valve opening time of the tank on-off solenoid valve reaches the predetermined time, it may be considered that the pressure state in the fuel tank corresponds to the atmospheric pressure. Consequently, when the output value of the fuel tank pressure sensor detected under the atmospheric pressure condition corresponds to a pressure other than the atmospheric pressure, it can be accurately determined that the fuel tank pressure sensor has a malfunction.

When an occupant operates a fuel feed switch for fuel feeding, valve-opening control is performed on the tank on-off solenoid valve to achieve the atmospheric pressure state in the fuel tank. In this case, the flow rate of the ambient air into the fuel tank or the flow rate of the evaporation in the fuel tank into the canister upon opening the tank on-off solenoid valve depends on the valve opening characteristics of the tank on-off solenoid valve. Thus, a time taken for the pressure in the fuel tank to return to the atmospheric pressure is set to a predetermined time using the flow rate of the ambient air into the fuel tank or the flow rate of the evaporation in the fuel tank into the canister according to the valve opening characteristics of the tank on-off solenoid valve, and thus when the valve opening time of the tank on-off solenoid valve reaches the predetermined time, it may be considered that the pressure state in the fuel tank corresponds to the atmospheric pressure. Therefore, when the output value of the pressure sensor detected under the atmospheric pressure condition corresponds to a pressure other than the atmospheric pressure, it can be accurately determined that the pressure sensor has a malfunction. Consequently, a malfunction of the pressure sensor of the fuel tank can be detected without using an additional pressure sensor.

As described above, according to the disclosure, a malfunction of the pressure sensor of the fuel tank can be detected without using an additional pressure sensor, and in addition, a malfunction of the pressure sensor of the fuel tank can be detected not only when the vehicle is stopped, but also when the vehicle is running.

The invention claimed is:

1. A pressure sensor malfunction determination device for a fuel tank, comprising:
  a fuel tank configured to store fuel for an engine;
  a canister configured to absorb an evaporated fuel gas in the fuel tank, the canister including a drain port opened to atmosphere;
  an evaporation path that communicates with the canister and the fuel tank;
  a purge gas path configured to communicate with an engine inlet system and the canister;
  a fuel tank pressure sensor configured to detect a pressure in the fuel tank;
  a tank on-off solenoid valve configured to open and close the evaporation path; and
  a control unit configured to control an opening and closing state of the tank on-off solenoid valve, wherein
  the control unit performs valve-opening control on the tank on-off solenoid valve when the pressure in the fuel tank detected by the fuel tank pressure sensor is at least one of a predetermined positive pressure state and a predetermined negative pressure state, and
  the control unit includes a pressure sensor malfunction determination unit configured to, when an output value of the fuel tank pressure sensor detected under a predetermined atmospheric pressure condition corresponds to a pressure other than an atmospheric pressure, determine that the fuel tank pressure sensor has a malfunction.

2. The pressure sensor malfunction determination device for a fuel tank according to claim 1, further comprising a purge control solenoid valve configured to open and close the purge gas path,
  wherein when the pressure in the fuel tank is in the predetermined positive pressure state, the pressure sensor malfunction determination unit performs the valve-opening control on the purge control solenoid valve as well as on the tank on-off solenoid valve, and the pressure sensor malfunction determination unit includes a positive-pressure-time pressure sensor malfunction determination unit configured to make determination as to malfunction of the fuel tank pressure sensor using the atmospheric pressure condition which is satisfied when a flow volume of an evaporated fuel gas exceeds a predetermined value of evaporation flow volume, the evaporated fuel gas being to be supplied from the fuel tank to the engine inlet system through the evaporation path and the purge gas path in a valve opened state of the tank on-off solenoid valve.

3. The pressure sensor malfunction determination device for a fuel tank according to claim 2,
wherein the positive-pressure-time pressure sensor malfunction determination unit determines that the flow volume of the evaporated fuel gas exceeds the predetermined value of evaporation flow volume when the tank on-off solenoid valve is opened at least a predetermined number of valve opening corresponding to an output value of the fuel tank pressure sensor, under a condition that the tank on-off solenoid valve is opened for a predetermined time for every predetermined interval by performing the valve-opening control on the tank on-off solenoid valve.

4. The pressure sensor malfunction determination device for a fuel tank according to claim 1, wherein
the pressure sensor malfunction determination unit performs the valve-opening control on the tank on-off solenoid valve when the pressure in the fuel tank is in the predetermined negative pressure state, and
the pressure sensor malfunction determination unit includes a negative-pressure-time pressure sensor malfunction determination unit configured to make determination as to malfunction of the fuel tank pressure sensor using the atmospheric pressure condition which is satisfied when a valve opening time of the tank on-off solenoid valve reaches a predetermined time.

5. The pressure sensor malfunction determination device for a fuel tank according to claim 1, further comprising
a fuel feed switch operable by an occupant when fuel is fed, wherein
when the fuel feed switch is operated by the occupant, the pressure sensor malfunction determination unit performs the valve-opening control on the tank on-off solenoid valve, and
the pressure sensor malfunction determination unit includes a fuel-feeding-time pressure sensor malfunction determination unit configured to determine that the fuel tank pressure sensor has a malfunction when the output value of the fuel tank pressure sensor detected under the atmospheric pressure condition corresponds to a pressure other than the atmospheric pressure, the atmospheric pressure condition being satisfied when a valve opening time of the tank on-off solenoid valve reaches a predetermined time.

6. The pressure sensor malfunction determination device for a fuel tank according to claim 2, further comprising
a fuel feed switch operable by an occupant when fuel is fed, wherein
when the fuel feed switch is operated by the occupant, the pressure sensor malfunction determination unit performs the valve-opening control on the tank on-off solenoid valve, and
the pressure sensor malfunction determination unit includes a fuel-feeding-time pressure sensor malfunction determination unit configured to determine that the fuel tank pressure sensor has a malfunction when the output value of the fuel tank pressure sensor detected under the atmospheric pressure condition corresponds to a pressure other than the atmospheric pressure, the atmospheric pressure condition being satisfied when a valve opening time of the tank on-off solenoid valve reaches a predetermined time.

7. The pressure sensor malfunction determination device for a fuel tank according to claim 3, further comprising
a fuel feed switch operable by an occupant when fuel is fed, wherein
when the fuel feed switch is operated by the occupant, the pressure sensor malfunction determination unit performs the valve-opening control on the tank on-off solenoid valve, and
the pressure sensor malfunction determination unit includes a fuel-feeding-time pressure sensor malfunction determination unit configured to determine that the fuel tank pressure sensor has a malfunction when the output value of the fuel tank pressure sensor detected under the atmospheric pressure condition corresponds to a pressure other than the atmospheric pressure, the atmospheric pressure condition being satisfied when a valve opening time of the tank on-off solenoid valve reaches a predetermined time.

8. The pressure sensor malfunction determination device for a fuel tank according to claim 4, further comprising
a fuel feed switch operable by an occupant when fuel is fed, wherein
when the fuel feed switch is operated by the occupant, the pressure sensor malfunction determination unit performs the valve-opening control on the tank on-off solenoid valve, and
the pressure sensor malfunction determination unit includes a fuel-feeding-time pressure sensor malfunction determination unit configured to determine that the fuel tank pressure sensor has a malfunction when the output value of the fuel tank pressure sensor detected under the atmospheric pressure condition corresponds to a pressure other than the atmospheric pressure, the atmospheric pressure condition being satisfied when a valve opening time of the tank on-off solenoid valve reaches a predetermined time.

9. A pressure sensor malfunction determination device for a fuel tank, comprising:
a fuel tank configured to store fuel for an engine;
a canister configured to absorb an evaporated fuel gas in the fuel tank, the canister including a drain port opened to atmosphere;
an evaporation path that communicates with the canister and the fuel tank;
a purge gas path configured to communicate with an engine inlet system and the canister;
a fuel tank pressure sensor configured detect a pressure in the fuel tank;
a tank on-off solenoid valve configured open and close the evaporation path;
a fuel feed switch operable by an occupant when fuel is fed; and
a control unit configured to control an opening and closing state of the tank on-off solenoid valve, wherein
the control unit performs valve-opening control on the tank on-off solenoid valve when the fuel feed switch is operated by the occupant, and the control unit includes a fuel-feeding-time pressure sensor malfunction determination unit configured to determine that the fuel tank pressure sensor has a malfunction when an output value of the fuel tank pressure sensor detected under an atmospheric pressure condition corresponds to a pressure other than an atmospheric pressure, the atmospheric pressure condition being satisfied when a valve opening time of the tank on-off solenoid valve reaches a predetermined time.

* * * * *